(12) United States Patent
Thore et al.

(10) Patent No.: US 7,292,241 B2
(45) Date of Patent: Nov. 6, 2007

(54) PROCESS FOR CALCULATING MESHED REALIZATIONS OF A RESERVOIR

(75) Inventors: Pierre Thore, Pau Cedex (FR); Olivier Robbe, Pau Cedex (FR)

(73) Assignee: Total SA, Courbevoie (FR)

( * ) Notice: Subject to any disclaimer, the term of this patent is extended or adjusted under 35 U.S.C. 154(b) by 288 days.

(21) Appl. No.: 10/648,710

(22) Filed: Aug. 26, 2003

(65) Prior Publication Data

US 2004/0220789 A1 Nov. 4, 2004

(30) Foreign Application Priority Data

Aug. 26, 2002 (EP) ................................. 02292099

(51) Int. Cl.
*G06T 17/00* (2006.01)
(52) U.S. Cl. .................................................. 345/420
(58) Field of Classification Search ................... None
See application file for complete search history.

(56) References Cited

U.S. PATENT DOCUMENTS

| | | | | |
|---|---|---|---|---|
| 4,821,164 A * | 4/1989 | Swanson | ....................... | 702/5 |
| 4,991,095 A * | 2/1991 | Swanson | ....................... | 702/16 |
| 5,465,323 A | 11/1995 | Mallet | ........................ | 395/123 |
| 5,844,564 A | 12/1998 | Bennis et al. | ............... | 345/423 |
| 5,953,680 A * | 9/1999 | Divies et al. | .................. | 702/5 |
| 6,370,491 B1 * | 4/2002 | Malthe-Sorenssen et al. | .. | 703/2 |
| 6,446,006 B1 | 9/2002 | Thore | ............................ | 702/5 |
| 6,480,790 B1 * | 11/2002 | Calvert et al. | ................ | 702/14 |
| 6,694,264 B2 * | 2/2004 | Grace | .......................... | 702/16 |
| 2003/0132934 A1 * | 7/2003 | Fremming | .................. | 345/419 |
| 2005/0125203 A1 * | 6/2005 | Hartman | ........................ | 703/1 |

* cited by examiner

*Primary Examiner*—Ulka J. Chauhan
*Assistant Examiner*—Peter-Anthony Pappas
(74) *Attorney, Agent, or Firm*—Baker Botts L.L.P.

(57) ABSTRACT

A process for calculating a meshed description of a realization of an oil-bearing reservoir takes as its starting point a reference realization of the reservoir with a plurality of stratigraphic surfaces, a meshed reference description for the reference realization comprising a plurality of planes some of which describe the stratigraphic surfaces, each plane comprising a plurality of points, at least two stratigraphic surfaces of the realization corresponding to two stratigraphic surfaces of the reference realization. A plane of the meshed description representing one of the two stratigraphic surfaces of the realization is obtained by applying displacements to the points of the planes of the reference description, making it possible to pass from the reference stratigraphic surface to the stratigraphic surface in the realization. The other planes of the description are obtained thereafter by interpolation. The process makes it possible to preserve homology both of structure and of representation between the various realizations. It avoids the need to recalculate ex nihilo a meshed description of the reference.

6 Claims, 8 Drawing Sheets

PROCESS FOR CALCULATING MESHED REALIZATIONS OF A RESERVOIR

FIELD OF THE INVENTION

The present invention relates to the field of geology, and more particularly to oil exploration.

BACKGROUND INFORMATION

It is known, in particular in oil exploration, to determine the position of oil-bearing reservoirs on the basis of the results of geophysical measurements made from the surface or in drilling wells. These measurements typically involve sending a wave into the subsoil and measuring the various reflections of the wave off the sought-after geological structures—surfaces separating distinct materials, faults, etc. (technique of reflection seismic surveying). Other measurements are made from wells. Acoustic waves, gamma radiations or electrical signals are then sent into the subsoil. These techniques involve the processing of the measurements so as to reconstruct a model of the subsoil. The processing of the measurements is affected by uncertainties of various kinds. For reflection seismic surveying:

A first uncertainty is the uncertainty of picking. In geophysical measurements, picking refers to the tracking over the images or over the successive seismic sections provided by processing of the measurements of a seismic marker, for example a geological horizon, to define a surface. It is possible for the operator to confuse neighbouring markers or else to associate markers that are not part of one and the same surface. The picking uncertainty may be from a few meters to a few tens of meters; the value of a few meters corresponds more or less to the resolution, i.e. to the width of the pulses of the signals emitted into the subsoil; the value of a few tens of meters corresponds to a seismic marker positioning error.

Another uncertainty is the uncertainty regarding the velocity field in the subsoil. The depth-wise rendering of the seismic measurements performed in the time domain (this depth-wise rendering makes it possible to pass from a temporal representation to a spatial representation); the temporal representation is that provided by the measurement instruments—which typically measure the reflections of the wave emitted. The spatial representation is obtained on the basis of hypotheses regarding the velocity field in the subsoil. It assumes in fact hypotheses regarding the nature of the materials traversed and regarding the speed of propagation of the wave in these materials. Now, a velocity field hypotheses is affected by an uncertainty. This uncertainty regarding the velocity field may lead to positional uncertainties of the order of 50 meters.

Another uncertainty is the uncertainty due to migration. In this field, "migration" refers to the operation which makes it possible to correctly reposition the events in space. The uncertainty regarding migration is dependent on the geological context; it may be almost zero for tabular or quasi-tabular structures and reach hundreds of meters for complex structures, such as salt domes with vertical or quasi-vertical walls.

The presence of particular structures—faults for example—attenuating the reflection or causing diffractions of the emitted wave causes other uncertainties also.

By virtue of the measurements performed in wells it is possible to chart the limits of geological structures. The information thus obtained is also tainted by uncertainties; these uncertainties originate essentially from the measurements of position of the well.

Uncertainties of registration are due to the transferring of the limits of geological structures measured in the well to any seismic section intersecting the well; they originate in essence from resolution problems.

French Patent Application No. 2 797 329 describes a method of devising impact position probability maps for a well. This document contains a discussion of the uncertainties related to time and depth migrations and corresponding positional errors.

In view of these uncertainties, the processing of geophysical measurements may lead to the proposing of several realizations of the structures of the subsoil. For reservoirs—which are the structures sought by oil exploration—surfaces are proposed that are representative of the top of the reservoir, of the bottom of the reservoir and of interfaces between intermediate layers. A realization then consists of a possible set of surfaces representing the reservoir, corresponding to a set of hypotheses. Typically, in oil exploration, up to 300 realizations are provided, corresponding to the various possible hypotheses. By way of indication, the provision of a realization (so-called reference realization) on the basis of the results of geophysical measurements is an operation which, even with the assistance of a software tool, corresponds to considerable work, of possibly as much as 1 month/man for a practised specialist; when the seismic survey has been interpreted, the construction of a surface description of a reservoir may take a week or more. The collecting of the uncertainties also represents a week, their integration into a piece of software a day and the calculation of the realizations a few hours. Over a global area of 20 km$^2$, a surface may be represented by triangles of side 100 m, hence a few thousand points per surface. A realization may involve 1 to 5 intermediate surfaces in addition to the surfaces of the top and of the bottom of the reservoir.

French Patent Application No. 2 652 180 describes a process for modelling surfaces. It suggests the use of a meshed computerized description of the surfaces. With some of the nodes of the meshed surface are associated constraints—representative for example of the known position of certain nodes or of a given uncertainty regarding the position of certain nodes. The computerized description of the surface is thereafter adapted to the constraints, using a method referred to as "Discrete Smooth Interpolation" (DSI).

Moreover, to represent the petrophysical properties of a reservoir, use is made of a grid or meshed volume model, as described in U.S. Pat. No. 4,821,164. The process described in this publication comprises steps of constructing a separate plane for each of the critical surfaces bounding the volume and of constructing layers of cells as a function of the stratigraphic structure. The meshed volume model thus comprises a number of planes greater than the number of critical surfaces. The implementation of a volume model such as this also involves appreciable work. A volume model may exhibit from 200,000 to a million points, over some thirty successive planes. The provision of a grid may represent from 1 to 2 months/man of work.

European Patent Application No. 0801364 (corresponding to U.S. Pat. No. 5,844,564) discloses a method for generating a three-dimensional meshed model of a geological structure. This method involves modelling the surfaces of the geological structure. Following this, the region of interest is split up after which each one of the macroblocks resulting from the splitting-up operation is meshed. The meshing involves interpolation and an iterative process of meshing relaxation for adaptation to the surfaces. This document, like U.S. Pat. No. 4,821,164 provides three-dimensional meshing of a given structure.

SUMMARY OF THE INVENTION

There is therefore a preference for a solution which allows the simple provision, for realizations obtained on the basis of geophysical measurements, of grids, otherwise stated of meshed models of realizations.

In one exemplary embodiment according to the present invention, a process is provided for calculating a meshed description of a realization of a reservoir. The realization comprises a plurality of stratigraphic surfaces. For example, this process includes provisions of:

(a) obtaining a reference realization of the reservoir, the reference realization comprising the stratigraphic surfaces;

(b) obtaining a meshed reference description for the reference realization, the reference description comprising a plurality of planes, at least some of the planes describing the stratigraphic surfaces, each of the planes comprising a plurality of points;

(c) obtaining at least two particular surfaces of the stratigraphic surfaces of the realization corresponding to two stratigraphic surfaces of the reference realization;

(d) for two homologous points of the plurality of points of two particular planes of the plurality of planes describing the two stratigraphic surfaces of the reference realization, i. determining two points underlying the two homologous points on the two stratigraphic surfaces of the reference realization, ii. calculating displacements of the two underlying points when the two stratigraphic surfaces of the reference realization are changed into the corresponding particular surfaces of the realization, iii. selecting the displaced underlying points as two homologous points of the planes of the meshed description describing the particular surfaces of the realization, and (e) determining planes of the meshed description by an interpolation between homologous points of the planes of the meshed description describing the particular surfaces of the realization.

In one exemplary embodiment, the two stratigraphic surfaces of the realization comprise the top surface and/or the bottom surface of the realization.

The interpolation can also comprise, for another stratigraphic surface of the realization and for two homologous points of the planes of the meshed description, the calculation of the intersection between the other stratigraphic surface and a straight line passing through the two homologous points, the intersection constituting a point of the plane of the meshed description describing the other stratigraphic surface.

The interpolation can also comprise, for two homologous points of two planes of the meshed description describing adjacent stratigraphic surfaces, the provision of a point of another plane on the straight line joining these two homologous points, in the same length proportions as in the meshed reference description.

In the case where the planes of the meshed reference description extending between two planes describing adjacent stratigraphic surfaces are parallel, the interpolation may comprise, for two homologous points of these two planes, the provision of a point of another plane on the straight line joining these two homologous points so that the planes of the meshed description corresponding to the parallel planes of the meshed reference description are parallel.

The meshed reference description may also comprise at least one irregular point with at least two positions. In such case, the calculation of a corresponding irregular point of the meshed description comprises:

a search for regular points of the meshed reference description which neighbour a position of the irregular point;

the calculation of a position of the corresponding irregular point in the meshed description on the basis of the displacements of the neighbouring regular points between the meshed reference description and the meshed description.

According to another exemplary embodiment of the present invention, a program is provided for calculating a meshed description of a realization of a reservoir. The realization comprising a plurality of stratigraphic surfaces. This program includes:

(a) a first module which is configured to introduce:

i. a reference realization of the reservoir, the reference realization comprising the stratigraphic surfaces, ii. a meshed reference description for the reference realization; the reference description comprising a plurality of planes, at least some of the planes describing the stratigraphic surfaces, each of the planes comprising a plurality of points, iii. at least two particular surfaces of the stratigraphic surfaces of the realization corresponding to two stratigraphic surfaces of the reference realization;

(b) a second module which is configured to calculate, for two homologous points of the two planes describing the two stratigraphic surfaces of the reference realization, i. two points underlying the two homologous points on the two stratigraphic surfaces of the reference realization, ii. displacements of the two underlying points in the transit of the two stratigraphic surfaces of the reference realization to the two corresponding stratigraphic surfaces of the realization, and iii. the two displaced underlying points being two homologous points of the two planes of the meshed description describing the two stratigraphic surfaces of the realization; and (c) a third module which is configured to calculate planes of the meshed description by interpolation between the homologous points of these two planes.

The routines may also be adapted to the implementation of the various alternatives of the process.

Other characteristics and advantages of the invention will become apparent on reading the detailed description which follows of the embodiments of the invention, which are given by way of example only and with reference to the drawings.

DETAILED DESCRIPTION OF PREFERRED EMBODIMENTS

An exemplary embodiment of the present invention provides that the grid or meshed model of a realization be determined on the basis of the grid or meshed model already determined for the surfaces of another realization. According to this invention, the various realizations derive from the same geophysical data and that the similarities between realizations are sufficient to avoid the need to calculate the entire grid again for a new realization.

The following notation is used subsequently in the description. $S^o_1, S^o_2, \ldots, S^o_n$, denotes the surfaces of a realization $R^o$, so-called reference realization, for which a grid is available. In this reference realization, $S^o_1$ is the top surface, $S^o_n$ is the bottom surface and $S^o_i$, $1<i<n$, are the intermediate surfaces. As indicated above, n has a value typically lying between 3 and 7—the realization exhibiting from 1 to 5 intermediate surfaces. The volume extending between two surfaces of the realization is subsequently referred to as a "layer". Each surface $S^o_i$ can be represented by a set of points $M^o_{i,j}$.

For example, a reference frame can be considered in which the z direction is the downwardly oriented vertical, the x and y directions providing the horizontal. The number of points for a surface may typically reach several thousand. As explained above, with each point may be associated one or more uncertainties, customarily expressed in the form of a vector. The representation of the surfaces of the reference realization like other realizations is irrelevant to the process described. A representation of the surfaces $S^o_i$ by points $M^o_{i,j}$ is considered by way of example subsequently.

The grid $G^o$ associated with the reference realization is denoted $G^o_1, G^o_2, \ldots, G^o_m$ and is subsequently dubbed the reference grid. In this notation $G^o_j$ denotes a plane of the grid. Such a plane may stand on a surface $S^o_i$ of the realization; it may also be a plane extending in a layer between two surfaces of the realization. The use of the term "plane" does not in any way imply that the "planes" $G^o_j$ exhibit the geometric structure of a plane in the conventional sense of this term in mathematics; on the other hand, the "planes" $G^o_j$ exhibit the topological structure of the plane in the conventional sense. The reference grid is formed of a set of points $N^o_{g,h,i}$ with coordinates $(u_g, v_h, w_i)$. The points $(u_g, v_h, w_i)$ for a fixed value of i representing the modelling of the surface $S^o_i$. The indices g and h are integer indices whose values are dependent on the number of points in the grid for the plane $G_i$. It is understood from this notation that the grid exhibits for each plane a similar topology. It will be noted that the points of neighbouring planes may be merged, for example when the underlying surfaces are canted and a layer disappears. The similarity between the topologies of the planes does not therefore exclude a variety of the geometry of these planes.

This hypothesis of homology in the modelling simplifies the calculations, but is in no way indispensable to the implementation of the invention. Two points $(u_g, v_h, w_{i1})$ and $(u_g, v_h, w_{i2})$ for two different values i1 and i2 may be dubbed homologous in the surfaces $S^o_{i1}$ and $S^o_{i2}$; stated otherwise, from the geological point of view, they correspond to a sedimentation on one and the same point. A set of points $(u_g, v_h, w_i)$, for fixed values g and h and a value of i varying from 1 to m, is then referred to as a "pillar". The pillar is denoted $P^o_{g,h}$. From the qualitative point of view, a pillar consists of a set of points superposed along the direction of sedimentation—before any deformation. This hypothesis regarding the grid is not necessary to the realization according to an exemplary embodiment of the present invention, as described subsequently; it is, however, an embodiment corresponding to a grid provided according to the solutions of the state of the art.

$S^k_1, S^k_2, \ldots, S^k_n$ denotes the surfaces of another realization $R^k$. The realization $R^k$ is represented by points, just like the reference realization; in this first representation, the surface $S^k_i$ is represented by a set of points $M^k_{i,j}$, corresponding to the points $M^o_{i,j}$. The realization can also be represented by the set of points $M^o_{i,j}$ of the reference realization, matched with a sampling of the displacements of each of these points so as to reach the other realization; this second representation of the other realization corresponds in fact to correlated values of the uncertainties at the various points. In either representation it is possible to definite a homology between the points of the two realizations: two points of the two realizations are homologous insofar as they represent the same point of the underlying geological structure, in two hypotheses corresponding to the two realizations. For the description of the invention, the first representation is considered subsequently.

As explained above, the problem of the invention is to make available a grid or meshed model for this realization $R^k$. This grid can be provided on the basis of the reference grid $G^o$.

Figure 1:
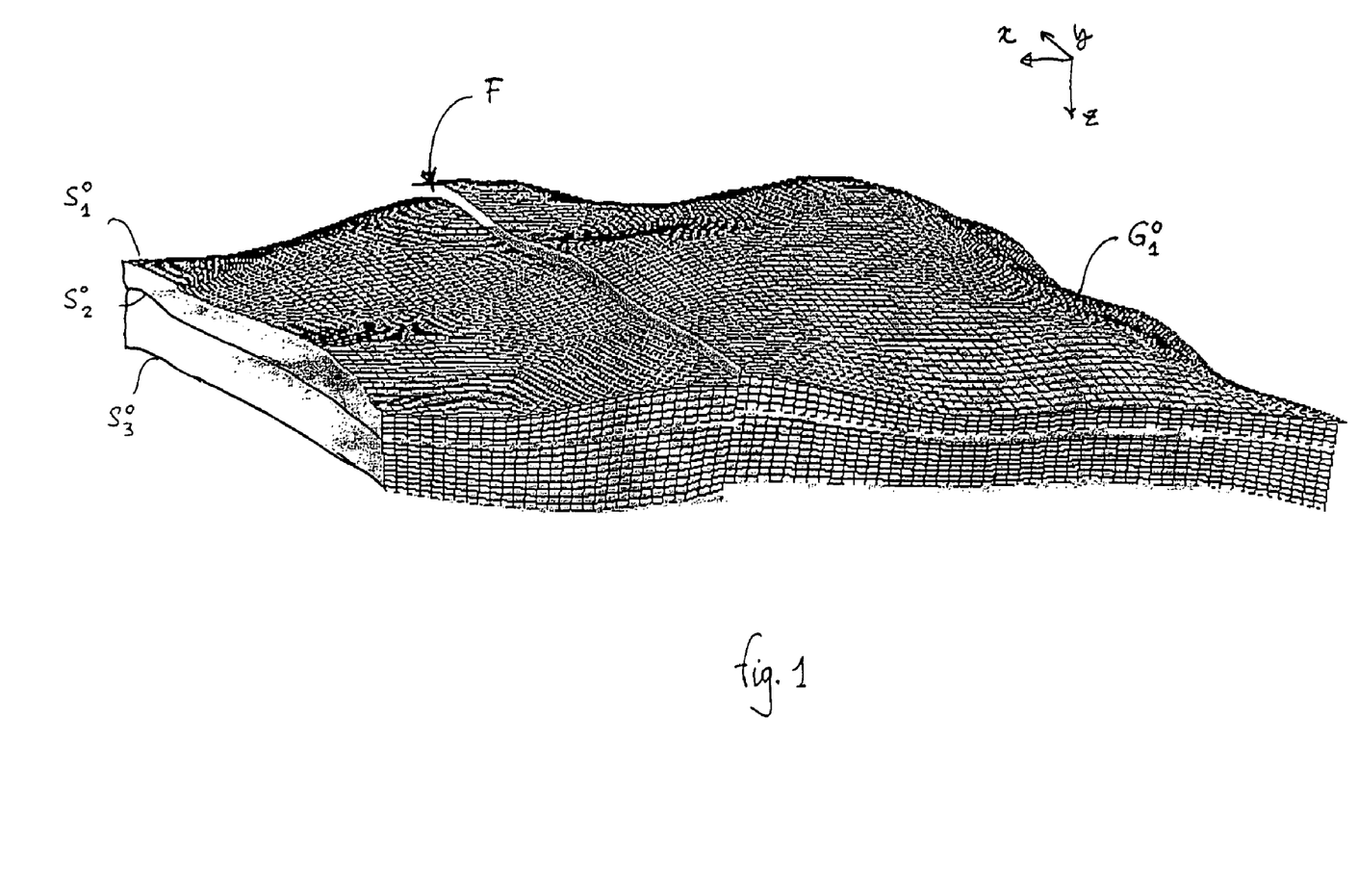
FIG. 1 is a diagrammatic representation of a reservoir with the surfaces of a realization.

FIG. 1 shows a diagrammatic representation of a reservoir with the surfaces of the reference realization $R^o$. Represented in FIG. 1 are the axes x, y and z of the reference frame, together with the surfaces $S^o_1, S^o_2, \ldots, S^o_n$ of the realization $R^o$, in an example with the number n of surfaces limited to 3 for reasons of clarity of the FIG. Represented furthermore in FIG. 1 is the mesh $G^o_1$ of the plane standing on the top surface $S^o_1$ of the realization; since the plane $G^o_1$ stands on the surface $S^o_1$, the latter is hard to see in the figure. The figure also shows a fault plane F traversing the reservoir; details regarding faults are given further on. Finally, the planes $G^o_2$ to $G^o_m$ have been represented, but only on the edge of the reservoir situated in front in the perspective view of FIG. 1, by plotting the corresponding pillars. For the sake of clarity of the figure, the other points of these planes have not been represented.

Figure 2:
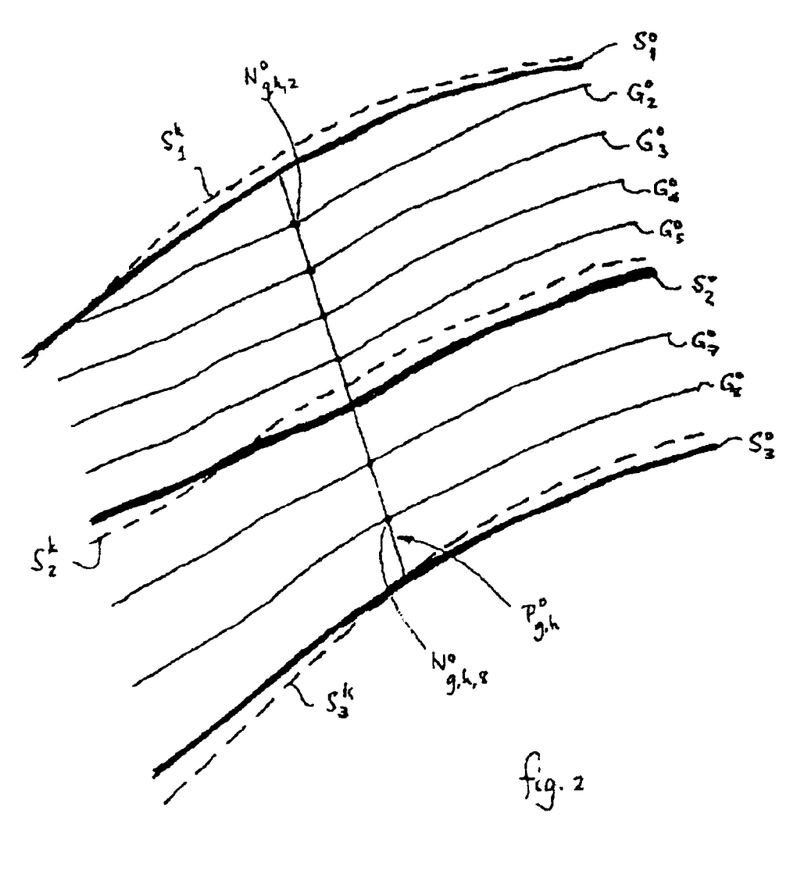
FIG. 2 is a sectional diagrammatic representation in a vertical plane of the surfaces of two realizations and of the planes of a reference grid corresponding to one of the realizations.

FIG. 2 shows a sectional diagrammatic representation in a vertical plane of the surfaces of two realizations and of the planes of a reference grid; in a real situation, there is no reason for the points of the surfaces or the points of the grid to be in a plane like that of FIG. 2. FIG. 2 is therefore not representative from this point of view of a real situation, but is merely intended to allow explanation.

FIG. 2 shows a simple example of a reference realization $R^o$ exhibiting two layers defined by the surfaces $S^o_1, S^o_2$ and $S^o_3$. These surfaces are represented in bold in FIG. 2. The reference grid $G^0$ exhibits nine planes $G^o_1$ to $G^o_9$. The planes $G^o_1$, $G^o_6$, and $G^o_9$ "stand" on the surfaces $S^o_1$, $S^o_2$ and $S^o_3$, stated otherwise are modellings of these surfaces; they are not shown in the figure for reasons of clarity, insofar as they are very close to the surfaces on which they stand. Planes $G^o_2$ to $G^o_5$ are intermediate planes, in the layer defined between the surfaces $S^o_1$ and $S^o_2$; in this layer, the planes are parallel to the lower surface of the layer, this corresponding to a hypothesis of sedimentation regarding layer $S^o_2$ and of erosion by layer $S^o_1$. The planes $G^o_7$ and $G^o_8$ are intermediate planes, in the layer defined between the surfaces $S^o_2$, and $S^o_3$; in this layer, the planes are distributed in proportional manner; this corresponds to a subsidence during sedimentation. Stated otherwise, the points of a pillar are regularly distributed within the layer. The figure also shows the realization $R^k$; it also exhibits three surfaces $S^k_1$, $S^k_2$ and $S^k_3$, represented dashed in FIG. 2. These surfaces are close to the corresponding surfaces of the reference realization.

The figure also shows a pillar $P^o_{g,h}$ of the reference grid. This pillar is a straight line which in the example passes within the plane of the figure. Only the points $N^o_{g,h,2}$ and $N_{g,h,8}$, have been referenced in the figure, for greater clarity.

As explained above, the problem of the invention is to calculate or define on the basis of the reference realization $R^0$, of the reference grid $G^0$ a grid for the realization $G^k$. The process which makes it possible to define this grid is explained with reference to FIGS. 3 to 6, using the elements of FIG. 2.

FIGS. 3 to 6 show a flowchart of the steps of a process according to a first embodiment of the invention. In this embodiment, the pillars $P^o_{g,h}$ are straight lines. This characteristic corresponds to a construction constraint for the grid, which is useful to allow the use of software for fluid flow calculations in the reservoir.

Figure 3:
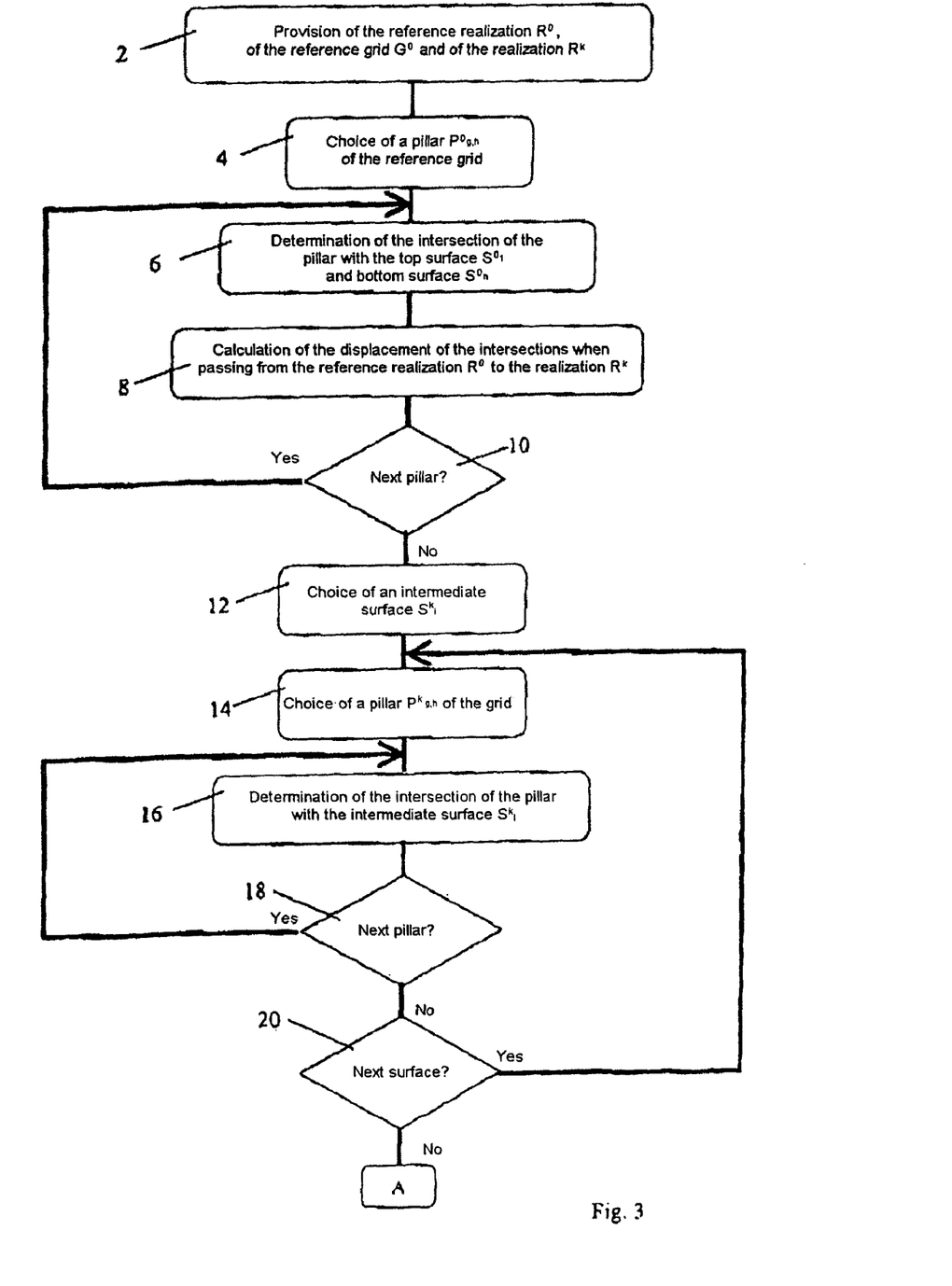
FIG. 3 shows a flowchart of a first set of exemplary steps of a process according to a first embodiment of the invention.

In FIG. 3, in the first step 2, one provides the reference realization $R^0$, the reference grid $G^0$ associated with this realization, and the realization $R^k$ for which one wishes to obtain a new grid. This step recalls the starting elements of the process.

In the next step 4, one considers a pillar $P^o_{g,h}$ of the grid $R^0$; for example, during the first iteration the pillar $P^o_{1,1}$ may be considered.

In steps 6 and 8, a displacement of this pillar is determined when passing from the realization $R^0$ to the realization $R^k$. To do this, it is possible to consider the displacement of the intersections of the pillar with the top surface $S^o_1$ and bottom surface $S^o_n$ when passing from realization $R^0$ to realization $R^k$. The intersections of the pillar with the top surface $S^o_1$ and bottom surface $S^o_n$ are in fact the underlying points of these surfaces that are subjacent to the ends of the pillar, stated otherwise the points of the surfaces that are represented by the ends of the pillar in realization $R^0$. It would also be possible to use another method to determine the underlying points, for example by considering the surface point closest to one end of the pillar.

In step 6 the intersection of the pillar with the top surface $S^o_1$ and bottom surface $S^o_n$ is determined in the reference representation. To do this, it is possible simply to consider the ends of the pillar, that is to say the points $N^o_{g,h,1}$ and $N^o_{g,h,n}$ and to calculate the intersections $I^o_{g,h,1}$ and $I^o_{g,h,n}$ of the straight line passing through these two points with the surfaces $S^o_1$ and $S^o_n$. If a mesh with triangular faces is used for the representation of the realization $R^0$, this amounts to determining the intersection of the straight line passing through the points $N^o_{g,h,1}$, and $N^o_{g,h,m}$ with one of the faces of the surface. The point $I^o_{g,h,1}$ is expressed as a barycenter or center of mass of the three vertices $M^o_{1,r1}$, $M^o_{1,r2}$ and $M^o_{1,r3}$ of the triangular face of the surface $S^o_1$ traversed by the pillar, with coefficients $\alpha_1$, $\beta_1$ and $\gamma_1$. The same holds for the point $I^o_{g,h,m}$, with coefficients $\alpha_m$, $\beta_m$ and $\gamma_m$. Of course, if the ends of the pillar are also points of the surface, it is sufficient to consider the points in question—which remains a barycenter with particular coefficients. As indicated above, for greater clarity, neither the points $I^o_{g,h,1}$ and $I^o_{g,h,9}$, nor the corresponding points of the surface have been plotted in FIG. 2.

In step 8, the displacement of the points $I^o_{g,h,1}$ and $I^o_{g,h,n}$ when passing from realization $R^0$ to realization $R^k$ is determined. Stated otherwise, one considers the points of the realization $R^k$ which correspond to the points $I^o_{g,h,1}$ and $I^o_{g,h,n}$ or are homologous to these points. If the surfaces $S^k_i$ of realization $R^k$ are represented by points $M^k_{i,r}$, as indicated above, the point $I^k_{g,h,1}$ of the top surface may simply be obtained by considering the barycenter of the points $M^k_{1,r1}$, $M^k_{1,r2}$ and $M^k_{1,r3}$ assigned the same coefficients $\alpha_1$ $\beta_1$ and $\gamma_1$. The same procedure can be showed for the bottom surface, with the corresponding coefficients. In this example, the barycentric coordinates with respect to the points closest to the surface are used.

On completion of this step, one has therefore found points $I^k_{g,h,1}$ and $I^k_{g,h,n}$ of the top surface $S^k_1$ and bottom surface $S^k_n$ of the other realization $R^k$ are located. These points constitute the ends of the pillar $P^k_{g,h}$ in the grid $R^k$.

In step 10, the next pillar is considered, and the process is repeated for this next pillar by looping to step 6. FIG. 2 does not explicitly illustrate the exit of the loop, when all the pillars have been processed; neither does it show how to run through the entire set of pillars, which may be arbitrary.

After proceeding through the loop for the entire set of pillars, the points $N^k_{g,h,1}$ and $N^k_{g,h,m}$ forming the planes $G^k_1$ and $G^k_m$ standing on the top and bottom surfaces of the other realization have been defined. The deterioration is made simply on the basis of
- the top and bottom surfaces $S^o_1$ and $S^o_n$ of the reference realization,
- the planes $G^o_1$ and $G^o_n$ standing on these surfaces and
- the top and bottom surfaces $S^k_1$ and $S^k_n$ of the other realization, the planes $G^k_1$ and $G^k_m$ standing on the top and bottom surfaces of the other realization $R^k$.

Figure 4:
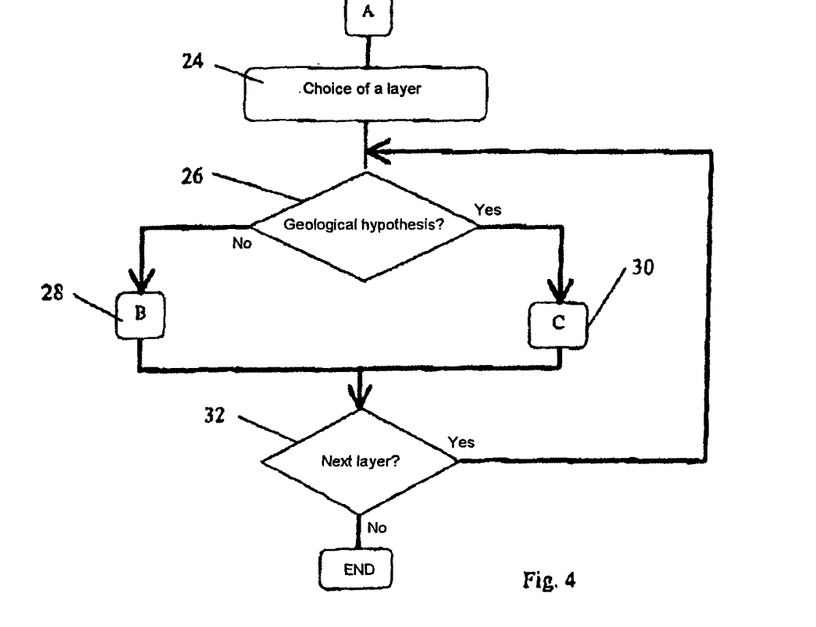
FIG. 4 shows a flowchart of a second set of exemplary steps of a process according to a second embodiment of the invention.
Figure 5:
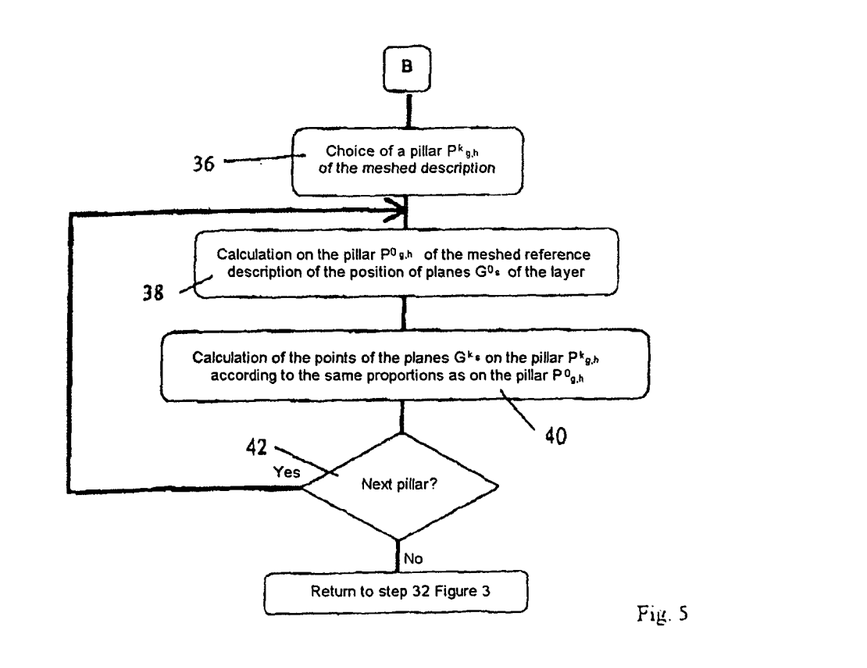
FIG. 5 shows a flowchart of a third set of exemplary steps of a process according to a third embodiment of the invention.
Figure 6:
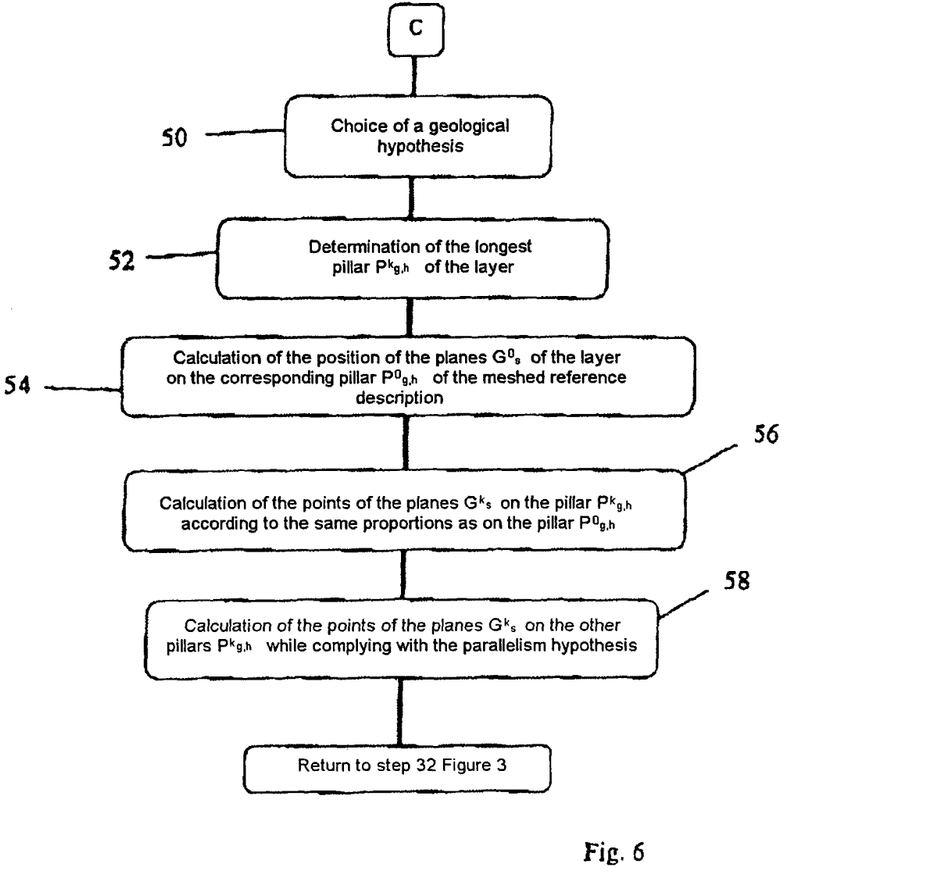
FIG. 6 shows a flowchart of a fourth set of exemplary steps of a process according to a fourth embodiment of the invention.

In steps 12 to 58 the intermediate planes of the grid $R^k$ are determined on the basis of the planes of the grid standing on the top and bottom surfaces of the other realization $R^k$. FIGS. 3 and 4 as well as FIGS. 5 and 6 show various possible solutions for interpolating the intermediate planes. The first solution, represented in the lower part of FIG. 3, is applied to the intermediate planes standing on surfaces of the realization $R^k$. The second solution, represented in FIG. 5, is applied to the planes defined inside a layer, in proportional mode, as in the layer between surfaces $S^o_2$ and $S^o_3$ in FIG. 2. This corresponds to a synsedimentary tectonic; the third solution, represented in FIG. 6, is applied to the planes defined inside a layer, when one wishes the grid $G^k$ to reproduce a particular geological hypothesis present in the grid $G^0$: it may, as in the layer between the surfaces $S^o_1$ and $S^o_2$ in FIG. 2, be an erosion ("On Lap" mode: erosion) or else planes parallel to the top surface, in a so-called "Top Lap" hypothesis, that is to say transgression-regression.

The lower part of FIG. 3, steps 12 to 22, makes it possible to define the planes of the grid $G^k$ standing on the intermediate surfaces of the realization. In step 12 an intermediate surface $S^k_i$ of the other realization is considered. This surface is homologous to a surface $S^o_i$ of the reference realization, on which a plane $G^o_i$ of the reference grid stands. A given pillar, for example the pillar $P^k_{g,h}$ of the grid $R^k$, is considered in step 14: this pillar is defined as the straight line—or the straight line segment if the surfaces considered in steps 4 to 10 are the bottom and the top—passing through two homologous points $N^k_{g,h,1}$ and $N^k_{g,h,n}$.

In step 16, the intersection of this pillar with the intermediate surface $S^k_i$ is calculated. It is possible to proceed as explained above in step 6. This intersection is considered as the point $N^k_{g,h,j}$ of the plane $G^k_j$ standing on the intermediate surface $S^k_i$.

In step 18, the next pillar is readied, and the calculation is recommenced for this next pillar, by looping to step 16. If there is no next pillar, we go to step 20. In step 20, the next surface is considered and the process loops to step 14. If there is no next surface, the process is forwarded to step 22.

These steps simply provide the corresponding plane $G^k_j$ for the intermediate surface $S^k_i$. This process preserves the property that a pillar of the meshed description $G^k$ is a straight line. This property may be useful, in particular to allow subsequent use of software for the flow stream in the reservoir. It also preserves a homology between the planes standing on the various surfaces, stated otherwise a similarity between the topologies of the surfaces. The process of steps 12 to 22 also preferably preserves the straightness of the pillars.

For example, the process of steps 12 to 22 operates only in so far as step 16 is possible—that is to say in so far as it is possible to calculate the intersection of the surface $S^k_i$ with the pillar. The process in steps 12 to 22 therefore can be adapted so as to provide the planes of the grid $G^k$ standing on the surfaces of this realization. In so far as these planes are obtained by intersection of the pillars with the surfaces, they provide an accurate meshed model of the surfaces.

It remains therefore to calculate or define the intermediate planes of the grid $G^k$, which do not stand on intermediate surfaces of the realization $R^k$. The process proposes two solutions for this purpose; it is advantageous, as explained hereinbelow, to implement two solutions, depending on the layers encountered. It would also be possible to implement just one of these two solutions for the entire realization.

In FIG. 4, in step 24, a layer is considered—stated otherwise two adjacent surfaces of the realization $R^k$, for which surfaces we already have corresponding planes, defined in steps 12 to 22, of the grid. During the first iteration we can consider the first layer, between the surfaces $S^0_1$ and $S^0_2$.

In the next step 26, the mode of interpolation of the planes of the layer is determined. In the case of a geological interpolation, we go to step 30 and in the case of a homothetic (linearly scaled) interpolation, we go to step 28. The respective definition of the planes of the layer in steps 28 and 30 is represented in FIGS. 5 and 6.

In step 32, the planes of the layer have been defined. If there still exists a layer to be processed, the next layer is reached, by looping to the step 26. Otherwise, the process is terminated.

As indicated above, one of the points of interest in the flowchart of FIG. 4 is that alternative solutions are proposed for calculating the intermediate planes by interpolation. It would also be possible to chose only a solution applied to all the layers defined between the surfaces of the realization $R^k$.

FIG. 5 shows a solution for interpolating the intermediate planes, under a hypothesis in which the intermediate planes of the realization $R^k$ in the layer in question are homothetic to the intermediate planes of the layer in question in the reference realization $R^0$. FIG. 5 corresponds to step 28 of FIG. 4. The solution of FIG. 5 relies on the definition of the planes $G^k_i$ of the meshed description $G^k$ in the same proportions as in the meshed reference description $G^0$. Stated otherwise, the relative positions of the planes $G^0_i$ of the layer in question in the meshed reference description $G^0$ are imported into the meshed description $G^k$. The solution of steps 36 to 42 is described for a layer, between two planes $G^k_p$ and $G^k_q$ standing on two surfaces $S^k_i$ and $S^k_{i+1}$ of the realization $R^k$. In the example of FIG. 2, we consider the layer extending between the surfaces $S^k_2$ and $S^k_3$ is considered, on which the planes $G^k_6$ and $G^k_9$ stand.

In step 36, a given pillar, for example the pillar $P^k_{g,h}$ of the grid $R^k$, is considered. This pillar is defined in the layer considered as the straight line segment extending between the points $N^k_{g,h,p}$ and $N^k_{g,h,q}$ of the planes $G^k_p$ and $G^k_q$. At the first iteration of the loop of FIG. 4, it is possible to simply consider the pillar $P^k_{1,1}$.

In step 38, for the corresponding pillar $P^0_{g,h}$ in the meshed reference description $G^0$, the position of the points $N^0_{g,h,t}$, $p<t<q$, of the planes of the reference grid is calculated extending inside the layer in question in the reference grid. The position of the various points is given for example by the ratio of the lengths to the ends of the segment, or, what is equivalent, by the coefficients of the barycenter with respect to these ends. It would also be possible to use coordinates in an orthonormal reference frame whose unit vector joins the ends of the pillar.

In step 40 we define the points $N^k_{g,h,t}$ on the pillar $P^k_{g,h}$ in such a way as to comply with the same proportions in this pillar as in the pillar $P^0_{g,h}$. This is performed by calculating the ratios of lengths over the segment $[N^k_{g,h,p}, N^k_{g,h,q}]$, or else by calculating the barycenter of the ends of the segment or finally by calculating a vector. This step makes it possible to define the points of the various planes of the layer in the pillar. In the example of FIG. 2, the points $N^k_{g,h,7}$ and $N^k_{g,h,8}$ are defined in this way, these points dividing the segment $[N^k_{g,h,6}$ and $N^k_{g,h,9}]$ in the same proportions as the points $N^0_{g,h,7}$ and $N^0_{g,h,8}$ divide the segment $[N^0_{g,h,6}, N^0_{g,h,9}]$ in the reference grid.

Thereafter the next pillar is attained, in step 42, by looping to step 38. If no next pillar exists, the process returns to step 32 of FIG. 3.

Figure 7:
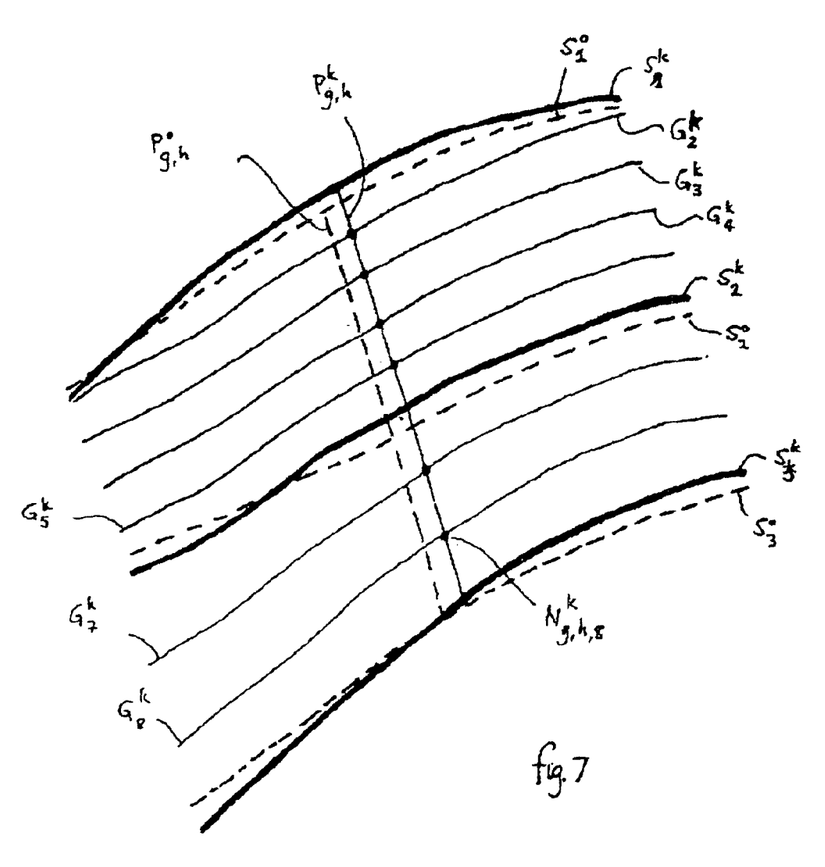
FIG. 7 is a diagrammatic representation similar to that of FIG. 2, showing the grid calculated according to the process of FIGS. 3 to 6.

Hence, the planes of the meshed description $G_k$ can be defined in a layer between the planes standing on two successive surfaces. In this layer, the relative positions of the planes are the same as those of the corresponding planes in the reference grid. Thus, in the example of FIG. 2, the planes $G^0_7$ and $G^0_8$ divide each pillar into three substantially equal parts in the layer extending in the reference grid between the surfaces $S^0_2$ and $S^0_3$; the same holds for the planes $G^k_7$ and $G^k_8$ in the layer extending in the grid $G^k$ between the surfaces $S^k_2$ and $S^k_3$ or the planes $G^k_6$ and $G^k_9$. This is represented in FIG. 7.

As in the case of FIG. 3, the interpolation proposed in FIG. 6 preserves the homology of the topologies of the intermediate planes. It also preserves the rectilinear character of the pillars.

FIG. 6 shows an exemplary solution for interpolating the intermediate planes, under a hypothesis in which the intermediate planes of the realization $R^k$ in the layer in question reproduce the same geological hypothesis as the intermediate planes of the layer in question in the reference realization $R^0$. This figure corresponds to step 30 of FIG. 4. In the example of FIG. 6 we consider two geological hypotheses, namely:

intermediate planes parallel to the lower plane of the layer in question; or intermediate planes parallel to the upper plane of the layer in question.

The first hypothesis corresponds to a sedimentation on the surface on which the lower plane stands and, if appropriate, to an erosion at the surface. The second hypothesis corresponds to a sedimentation with a marine regression or transgression. In FIG. 2, the layer between the surfaces $S^0{}_1$ and $S^0{}_2$ exhibits parallel planes $G^0{}_2$ and $G^0{}_5$ parallel to the lower plane $G^0{}_6$ standing on the surface $S^0{}_2$. The distribution of the planes in the layer corresponds to the first geological hypothesis described above.

The solution of FIG. 6 therefore relies on the definition of the planes $G^k{}_i$ of the meshed description $G^k$ in the other realization $R^k$, in such a way as to also comply with the same geological hypotheses in the layer in question as in the meshed reference description $G^0$. Stated otherwise, for the geological hypotheses of parallelism considered, the constraints of parallelism of the planes $G^0{}_i$ of the layer in question in the meshed reference description $G^0$ are imported into the meshed description $G^k$.

The solution of steps 36 and 42 is described for a layer, between two planes $G^k{}_p$ and $G^k{}_q$ standing on two surfaces $S^k{}_i$ and $S^k{}_{i+1}$ of the realization $R^k$. In the example of FIG. 2, the layer extending between the surfaces $S^k{}_1$ and $S^k{}_2$ is considered, on which the planes $G^k{}_1$ and $G^k{}_6$ stand.

In step 50 a geological hypothesis is considered; in the example considered this amounts to choosing which of the planes, upper and lower, of the layer the intermediate planes are parallel to.

In the next step 52, the longest pillar of the layer is determined. This amounts to maximizing the length of the segment $[N^k{}_{g,h,p}, N^k{}_{g,h,q}]$ over the entire set of pillars. The longest pillar $P^k{}_{g,h}$ is thus determined The intermediate planes are thereafter interpolated over the longest pillar. The points $N^k{}_{g,h,t}$, p<t<q of the intermediate planes can simply be distributed in a regular manner over the longest pillar; alternatively, as represented in step 54, it is possible to search for the position of the points $N^0{}_{g,h,t}$, p<t<q over the pillar of the reference grid $P^0{}_{g,h}$ corresponding to the longest pillar. In step 56, the points $N^k{}_{g,h,t}$ on the pillar $P^k{}_{g,h}$ can be defined in such a way as to comply with the same proportions on this pillar as on the pillar $P^0{}_{g,h}$. This can be performed as explained with reference to step 40 of FIG. 5.

In step 58, the points $N^k{}_{g',h',t}$ on the other pillars $P^k{}_{g',h'}$, are concluded with (g', h') different from (g, h), in such a way as to comply with the parallelism hypothesis. It is sufficient, in the example of a parallelism with the plane standing on the lower surface of the layer, for the distances between a point of an intermediate plane and the point of the same pillar of the lower plane to be equal for all the pillars, i.e.

$$d(N^k{}_{g',h',t}, N^k{}_{g',h',q}) = d(N^k{}_{g,h,t}, N^k{}_{g,h,q})$$

for any triplet (t, g', h') satisfying p<t<q and (g', h') different from (g, h). In this step, it is still possible for a plane to be partially merged with the bottom plane or the top plane—for example if the length of a pillar becomes too small with respect to the length of the longest pillar. The process of FIG. 6 therefore also makes it possible to represent planes terminating canted, that is geological pinchouts.

After step 58, the process returns to step 32 of FIG. 3.

Hence, we have managed to define the planes of the meshed description $G^k$ in a layer between the planes standing on two successive surfaces. In this layer, the parallelism of the planes is identical to the parallelism of the corresponding planes in the reference grid. Thus, in the example of FIG. 2, the planes $G^0{}_2$ to $G^0{}_5$ are parallel to the plane $G^0{}_6$ which stands on the surface $S^0{}_2$. Likewise, the planes $G^k{}_2$ to $G^k{}_5$ are parallel to the plane $G^0{}_6$ in the grid $G^k$.

FIG. 7 shows a representation analogous to that of FIG. 2, in which are represented
by dashes, the three surfaces $S^0{}_1$, $S^0{}_2$ and $S^0{}_3$ of the reference realization $R^0$, as well as the pillar $P^0{}_{g,h}$;
the three surfaces $S^k{}_1$, $S^k{}_2$ and $S^k{}_3$ of the realization $R^k$ as well as the grid $G^k$ obtained by the process described with reference to FIGS. 3 to 6, with the pillar $P^k{}_{g,h}$.

It is noted in the figure that the intermediate planes in the upper layer are as in FIG. 2 parallel to the lower surface of the layer, whereas the intermediate planes in the lower layer are regularly distributed in this layer. Once again, both FIG. 2 and FIG. 7 correspond to simple examples in which the surfaces are substantially plane and substantially parallel: the process also applies in respect of warped surfaces or complex shapes.

The process described in FIGS. 3 to 6 thus makes it possible to calculate a meshed description $G^k$ of a realization $R^k$, on the basis of
a reference realization $R^0$;
a meshed reference description $G^0$ of this reference realization; and
at least two stratigraphic surfaces $S^k{}_1$, $S^k{}_n$ of the realization $R^k$.

The process does not necessarily involve recalculating the entire meshed description for the new realization, but simply assumes knowledge of the homologous points of the surfaces inside a realization. It also assumes a displacement calculation, that is to say a homology of the representation between the various realizations. This is simply ensured in the examples proposed above if the realizations correspond to uncertainty samplings, or else if the realizations exhibit the same topology.

The calculation of a new meshed description $G^k$ according to the process of the invention can be performed in a few minutes of calculation time.

The process described with reference to FIGS. 3 to 6 is applied to all the surfaces and makes it possible to provide a meshed description. An embodiment in which a distinct processing is applied to points of the surfaces defining faults is now described with reference to FIGS. 8 and 9. The embodiment of FIG. 9 is not compulsory, but makes it possible to obtain a more continuous meshed description or one which is less disturbed by the faults.

Figure 8:
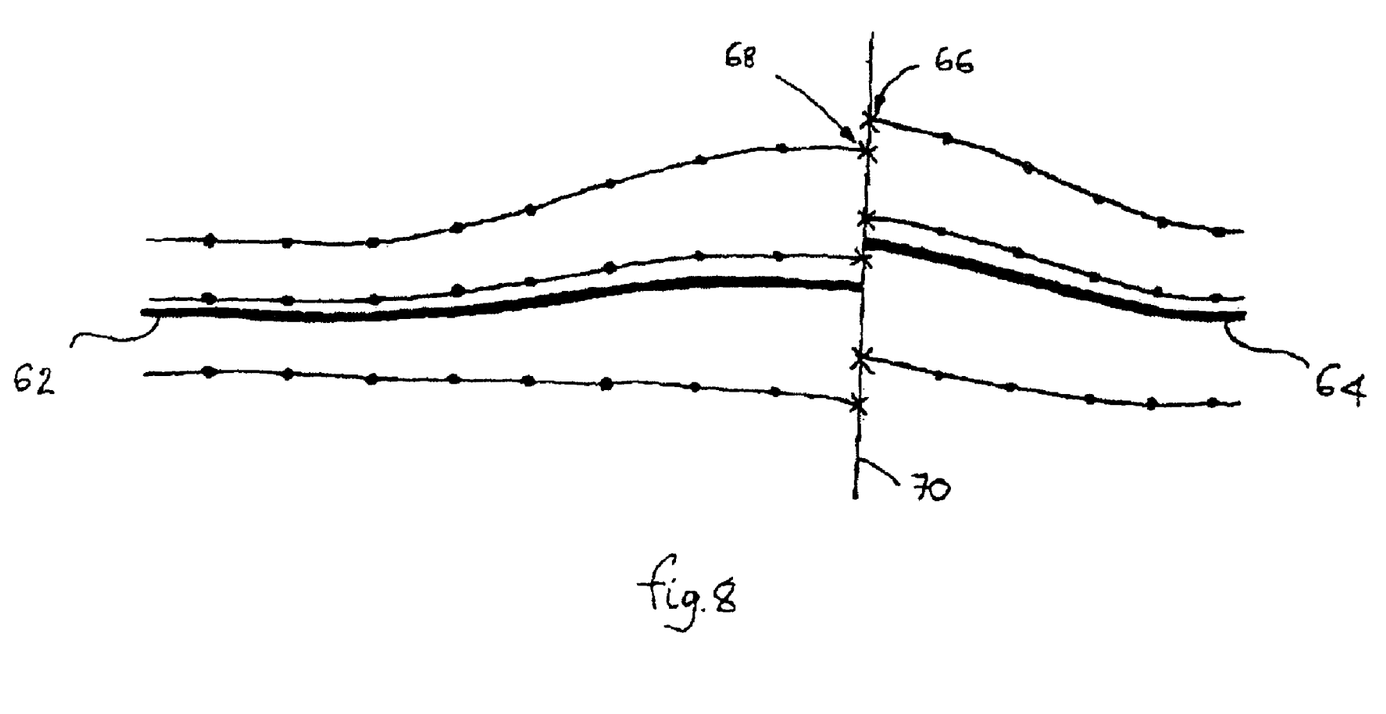
FIG. 8 is a diagrammatic representation of a fault node in a meshed description.
Figure 9:
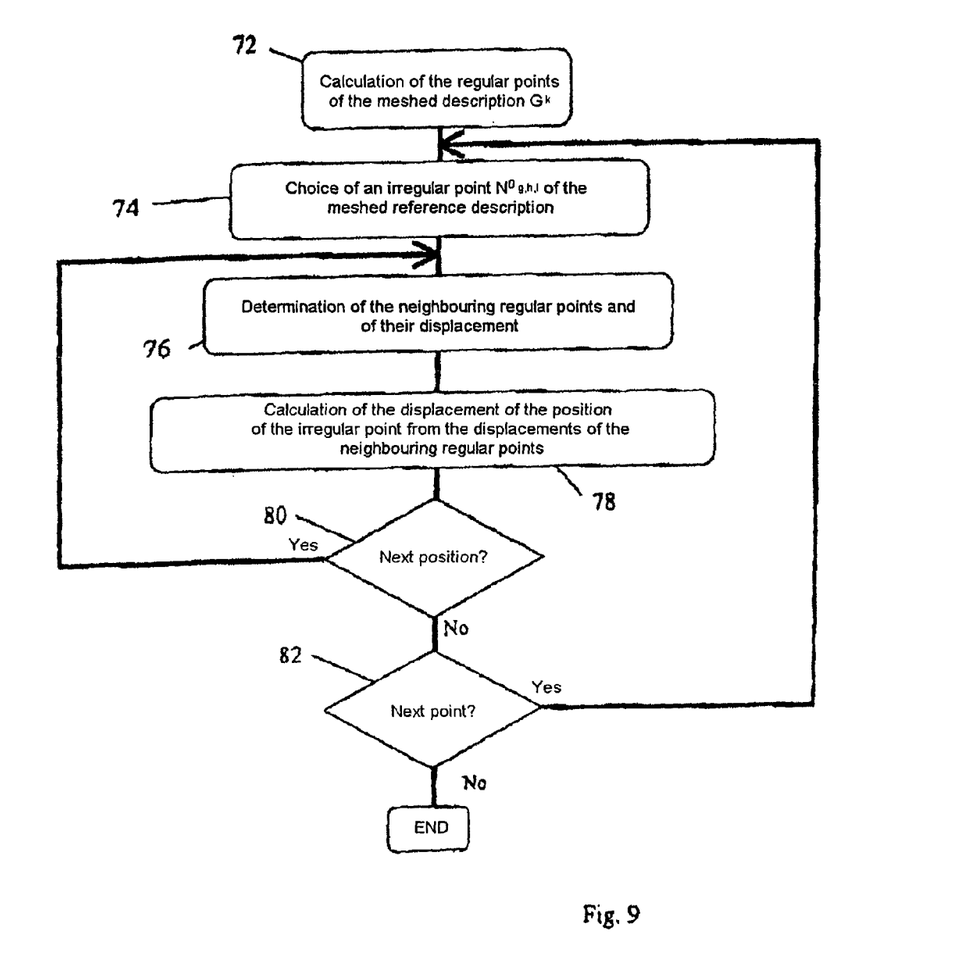
FIG. 9 shows the steps of a process applied to the fault nodes in an embodiment of the invention.

The embodiment of FIGS. 8 and 9 relies on the existence, in certain meshed descriptions of surfaces, of particular points. These points are representative of faults or of discontinuities in the surface described. To account for these discontinuities, the meshed description can use particular points, dubbed "split nodes". Such a point of the modelling can exhibit several geometrical positions corresponding to two or more fault panels. FIG. 8 shows a diagrammatic representation of a fault node in such a meshed description, in an example where the irregular points exhibit two positions. Represented in the figure are a surface and three planes on either side of the surface. The underlying surface exhibits a fault separating two parts 62 and 64 of the surface; in the example, the fault is substantially vertical. The points of the planes around the part 62 or the part 64 are said to be regular; they are represented in the example of FIG. 8 by points of circular shape on the planes. A point of the meshed description at the level of the fault is called a node or split point or else an irregular point; it exhibits two geometrical positions represented by crosses in FIG. 8. One of these positions can be used to define the edge of one part of the surface, while the other position is used to define the other part of the surface. The first position 66 of an irregular point, which position is used to define the edge of a plane on one side of the fault, is referenced in the figure. The other position 68 of the irregular point is used to define the edge of the plane on the other side of the fault. The two positions of the irregular point are on the same ruled surface 70 defining the fault panel.

In the process of FIG. 9, the irregular points of the surface are taken into account in a particular manner. For each of the geometrical positions of the irregular points, the displacement is obtained from the displacement of the neighbouring regular points. This solution makes it possible, in the meshed model obtained, to cater better for faults or irregularities. In particular, this solution ensures that the fault panel remains represented by a ruled surface.

The process of FIG. 9 commences with a calculation of the regular points of the meshed description $G^k$ of the realization $R^k$, according to the process described with reference to FIGS. 3 to 6. Step 72 represented in FIG. 9 is therefore a calculation of the regular points of the meshed descriptions of the planes $G^k_0$ and $G^k_m$ standing on the bottom surface and top surface $S^k_0$ and $S^k_n$, followed by a calculation of the regular points of the other planes $G^k_i$ by interpolation.

In step 74, an irregular point can be considered. This point is characterized by at least two positions, as explained with reference to FIG. 8. Hence let $N^0_{g,h,1}$ be an irregular point, which in the example forms part of the plane $G^0_1$ standing on the top surface and $T^0_{g,h,1}$ and $U^0_{g,h,1}$ be the two positions of this point.

In step 76, for a position of this point—for example for the position $T^0_{g,h,1}$ during the first iteration—the neighbouring regular points in the plane $G^0_1$ can be determined. The closest regular points can be considered, or moreover other regular points. The neighbouring positions of the irregular points can also be considered, for which the displacement has been calculated during the previous iterations. The number of points considered at this step is not essential—and in the limit it would likely be possible to consider just one neighbouring point.

In step 78, the displacement and the position of the irregular point are calculated—stated otherwise the position $T^k_{g,h,1}$ in the plane $G^k_1$ on the basis of the displacements of the neighbouring regular points. In the simplest case, a simple averaging of these displacements may be performed. It is also possible to weight the displacements, for example as a function of the distances between the position and the neighbouring regular points, or according to any other method. In the simplest case, the average of the displacements can be calculated, yielding:

$$\overrightarrow{T^0_{g,h,1} T^k_{g,h,1}} = \frac{\sum_{p1,p2} \overrightarrow{N^0_{p1,p2,1} N^k_{p1,p2,1}}}{\sum_{p1,p2} i}$$

with $N^0_{p1,p2,1}$ the regular points neighbouring the point $N^0_{g,h,1}$, the term in the denominator simply representing the number of regular points considered.

On completion of step 78, the position of an irregular point in the meshed description $G^k_0$ can be obtained.

In step 80, the process progresses to the next position of the irregular point, and loops to step 76. If all the positions of the irregular point in question have been processed, the process reaches step 82.

In step 82, the next irregular point is reached and the process is forwarded to step 74. If all the irregular points have been processed, the process is terminated.

Steps 72 to 82 thus make it possible to generate the irregular points in the meshed description $G^k$ of the realization $R^k$. The processing of the positions of the irregular points on the basis of the neighbouring regular points makes it possible to preserve in the meshed description $G^k$ the faults or the other irregularities existing in the meshed reference description.

The process of FIGS. 3 to 6, similar to that of FIG. 9, makes it possible to retain a topology similar to the topology of the meshed description $S^0$ of the reference realization $R^0$ for the planes $G^0_k$ of the meshed description $G^k$ of all the realizations $R^k$. One thus caters for the fact that the meshed description is calculated for a realization $R^k$ similar to the reference realization: the process takes into account and utilizes the homology which exists between the realizations. In so far as the property of the straightness of the pillars is ensured for the regular points, it is also preserved for the irregular points in the process of FIG. 9—in so far as the same choices of neighbouring points in each plane are considered for a pillar formed of irregular points.

In particular, the process of FIG. 9 ensures a preferably good representation of faults or irregularities; the faults represented by a ruled surface in the meshed reference description $G^0$ are also represented by a ruled surface in the meshed description $G^k$ obtained by the process.

The processes of FIGS. 3 to 6 and 9 can be implemented by appropriate programs, with routines corresponding to the various steps of the processes. The programming of such routines is within the scope of the person skilled in the art, having regard to the indications provided above with reference to the figures.

In order to make the programming of the invention relatively easy, it is preferable to use a high-level language, which allows object-type programming, such as C++ or the Java language. This type of processing is preferably integrated into a modeller having both a surface description and a meshed description so as to ascertain the topological relations between the elements such as points, pillars, layers and surfaces. Furthermore the software of modeller type already describes the basic functionalities such as the calculations of intersection. The software sold by the company Tsurf under the brand name GOCAD is a good example of this type of programming environment.

It should be understood that, the present invention is not limited to the embodiments described by way of example. In the examples proposed, the top and bottom surfaces of the realization are used for the interpolation of the pillars. It would also be possible to use other surfaces of this realization. The use of the top and bottom surfaces has the advantage of a maximum distance between the surfaces, thereby ensuring optimal accuracy in the interpolation of the pillar, for a given uncertainty in the plane of the surface. If these top and bottom surfaces are used, it is possible in all strictness to speak of intermediate surfaces, as above. Even if the top and bottom surfaces are not used, the process also applies to the surfaces situated above and below the surfaces used—although one is not dealing properly speaking with "intermediate" surfaces.

Additionally, in the flowchart of FIG. 3, the process is explained with a pillar by pillar calculation; it is possible to change the order of the calculations proposed, for example commencing with the search over the top surface for the points of transit of the pillars, followed by searching for the points on the bottom surface and finally the interpolation of the pillars.

Step 6 of the flowchart of FIG. 3 also assumes that the pillar is a straight line; in so far as the pillar is not a straight line, it is possible to consider the projection of the points $N^0_{g,h,1}$ and $N^0_{g,h,n}$ on the surfaces $S^0_1$ and $S^0_n$, in the same way as for the calculations relating to the top and to the bottom as described in step 8 and not the intersection proposed in step 6 of FIG. 3. This consideration applies naturally in respect of fault surfaces which are not necessarily ruled surfaces. In any event, one obtains the points $I^0_{g,h,1}$ and $I^0_{g,h,n}$ of the straight line passing through these two points with the surfaces $S^0_1$ and $S^0_n$.

As in the case of the flowchart of FIG. 3, it is possible to change the order of the steps of the flow chart of the other figures, in particular as regards the sweeping of the surfaces and the irregular points.

It is not indispensable to implement the solution of FIG. 9 in the absence of irregular points.

It is also recalled that the modelling used for the surfaces in the various realizations is irrelevant. In the example, surfaces modelled by points have been considered; a collection of points has also been considered for each realization. It would equally well be possible to model the various realizations by providing a set of points for the reference realization $R^0$ and n sets of uncertainty vectors corresponding to the other n realizations. A modelling of the surfaces of the other realizations is obtained in the same manner.

The choice of a mode of interpolation in a layer can be a starting given; it may also be deduced from the analysis of the position of the planes in the reference grid.

What is claimed is:

1. A process for calculating a meshed description of a realization of a reservoir, the realization comprising a plurality of stratigraphic surfaces, the process comprising:
    calculating the meshed description realization of the reservoir by:
    (a) obtaining a reference realization of the reservoir, the reference realization comprising the stratigraphic surfaces;
    (b) obtaining a meshed reference description for the reference realization, the reference description comprising a plurality of planes, at least some of the planes describing the stratigraphic surfaces, each of the planes comprising a plurality of points;
    (c) obtaining at least two particular surfaces of the stratigraphic surfaces of the realization corresponding to two stratigraphic surfaces of the reference realization;
    (d) for two homologous points of the plurality of points of two particular planes of the plurality of planes describing the two stratigraphic surfaces of the reference realization,
        i. determining two points underlying the two homologous points on the two stratigraphic surfaces of the reference realization,
        ii. calculating displacements of the two underlying points when the two stratigraphic surfaces of the reference realization are changed into the corresponding particular surfaces of the realization,
        iii. selecting the displaced underlying points as two homologous points of the planes of the meshed description describing the particular surfaces of the realization, and
    (e) determining planes of the meshed description by an interpolation between homologous points of the planes of the meshed description describing the particular surfaces of the realization; and
    (f) delivering the calculated meshed description realization of the reservoir to the user.

2. The process of claim 1, wherein the stratigraphic surfaces of the realization comprise at least one of a top surface and a bottom surface of the realization.

3. The process of claim 1, wherein the interpolation comprises, for another stratigraphic surfaces of the realization and for two homologous points of the planes of the meshed description, a calculation of the intersection between the other stratigraphic surfaces and a straight line passing through the two homologous points, the intersection constituting a point of the plane of the meshed description describing the other stratigraphic surfaces.

4. The process of claim 1, wherein the interpolation comprises, for two homologous points of the planes of the meshed description describing adjacent stratigraphic surfaces, a determination of a point of another plane on the straight line joining the homologous points, in approximately the same length proportions as in the meshed reference description.

5. The process of claim 1, wherein the planes of the meshed reference description extending between two planes describing adjacent stratigraphic surfaces run parallel, and wherein the interpolation comprises, for two homologous points of the planes, a determination of a point of another one of the planes on the straight line joining the homologous points so that the planes of the meshed description corresponding to the parallel planes of the meshed reference description run parallel.

6. The process of claim 1, wherein the meshed reference description comprises at least one irregular point having at least two positions, and wherein the calculation of a corresponding irregular point of the meshed description comprises:
    a search for regular points of the meshed reference description which neighbor a position of the irregular point;
    a calculation of a position of the corresponding irregular point in the meshed description as a function of the displacements of the neighboring regular points between the meshed reference description and the meshed description.

* * * * *